United States Patent [19]
Marchesano

[11] Patent Number: 4,756,997
[45] Date of Patent: Jul. 12, 1988

[54] PHOTOGRAPHIC SILVER HALIDE DEVELOPER COMPOSITIONS AND PROCESS FOR FORMING PHOTOGRAPHIC SILVER IMAGES

[75] Inventor: Carlo Marchesano, Savona, Italy

[73] Assignee: Minnesota Mining and Manufacturing Company, St. Paul, Minn.

[21] Appl. No.: 76,078

[22] Filed: Jul. 21, 1987

[30] Foreign Application Priority Data

Jul. 23, 1986 [IT] Italy .............................. 21207 A/86

[51] Int. Cl.[4] ......................... G02C 1/06; G02C 1/34; G02C 1/42; G02C 5/24

[52] U.S. Cl. .................................... 430/478; 430/264; 430/266; 430/268; 430/464; 430/467; 430/484; 430/485; 430/486; 430/489; 430/490; 430/492; 430/607

[58] Field of Search ............... 430/490, 492, 486, 484, 430/489, 467, 484, 485, 268, 607, 264, 266, 478

[56] References Cited

U.S. PATENT DOCUMENTS

| | | | |
|---|---|---|---|
| 3,128,187 | 4/1964 | Sagal et al. | 430/607 |
| 3,386,831 | 6/1968 | Honig et al. | 430/607 |
| 3,393,072 | 7/1968 | Ohi et al. | 430/607 |
| 3,396,028 | 8/1968 | Humphlett et al. | 430/607 |
| 3,457,079 | 7/1969 | Koda et al. | 430/607 |
| 3,499,764 | 3/1970 | Iwai et al. | 430/607 |
| 3,573,915 | 4/1971 | Luciani et al. | 430/607 |
| 4,003,748 | 1/1977 | Langen et al. | 434/546 |
| 4,111,697 | 9/1978 | Pollet et al. | 430/434 |
| 4,166,742 | 9/1979 | Mifune et al. | 96/107 |
| 4,168,977 | 9/1979 | Takada et al. | 96/63 |
| 4,221,857 | 9/1980 | Okutsu et al. | 430/264 |
| 4,241,164 | 12/1980 | Mifune et al. | 430/264 |
| 4,272,614 | 6/1981 | Mifune et al. | 420/441 |
| 4,323,643 | 4/1982 | Mifune et al. | 430/441 |
| 4,681,836 | 7/1987 | Inoue et al. | 430/264 X |

*Primary Examiner*—Mukund J. Shah
*Attorney, Agent, or Firm*—Donald M. Sell; James A. Smith; Mark A. Litman

[57] ABSTRACT

An aqueous alkaline photographic silver halide developer composition comprising a dihydroxy benzene developing agent, an auxiliary superadditive developing agent, an antifogging agent, an antioxidant and a buffering agent, characterized by the fact that the composition further comprises a stabilizing amount of an α-ketocarboxylic acid.

The developer composition has a better resistance against air oxidation and can be left in continuous transport automatic processors for several days without undergoing any substantial decrease of its developing properties.

The developer composition is particularly useful in a process for the formation of a high contrast silver image by developing silver halide photographic elements including at least a negative acting surface latent image type silver halide emulsion in the presence of a hydrazine compound, preferably in the additional presence of an effective amount of a contrast promoting agent.

25 Claims, No Drawings

PHOTOGRAPHIC SILVER HALIDE DEVELOPER COMPOSITIONS AND PROCESS FOR FORMING PHOTOGRAPHIC SILVER IMAGES

FIELD OF THE INVENTION

The present invention relates to photographic silver halide developer compositions, particularly to photographic silver halide developer compositions having an improved resistance to air oxidation, and to a process for forming a silver image by developing a silver halide photographic element, particularly to a process for forming a high-contrast negative silver image.

BACKGROUND OF THE ART

In general, the processing of black and white silver halide photographic materials is performed in the order of development, stopping, fixing and washing.

Development is ordinarily carried out with aqueous alkaline developer compositions containing a developing agent, usually of the dihydroxybenzene type such as hydroquinone. The activity of these developing agents is greatly influenced by the pH of the solution and the optimum pH range should not significantly change during the useful life of the developer composition; therefore the composition has always to possess a high buffering capacity. The developer compositions are usually provided with antifogging agents (in particular inorganic antifogging agents such as soluble bromides and organic antifogging agents) to retard the development of non-exposed silver halide grains and decrease fog, i.e. silver formed as a result of the development of said grains.

Antioxidant compounds are usually added to the alkaline developer composition to limit oxidation of the developing agents by air. Alkaline and ammonium sulfites are the most common compounds used for this purpose, but other antioxidant compounds such as hydroxylamine and ascorbic acid can be used instead of or in combination with such sulfites.

It is a well-known phenomenon that traces of certain metal ions, such as copper and iron ions, have a catalytic effect on the aerial oxidation of the developing agents (the metal ions may have been introduced as impurities in the water or in the chemicals used to compound the developer composition). The catalytic effect of said ions on the aerial oxidation of developing agents can be reduced by suitable sequestering agents. Sequestering agents work by forming fairly stable and soluble complexes with the metallic ions so that free metal ions are present only in small amounts.

However, the activity of antioxidant compounds and sequestering agents to improve the resistance to aerial oxidation is much reduced when silver halide photographic materials are treated in continuous transport processing machines, especially at high temperatures. In this case, considerably high quantities of air are introduced into the developer composition used in processing machines, said aeration causing a rapid degradation of the developer itself.

The problem of resistance to aerial oxidation is particularly serious in developing compositions intended for processes of high contrast silver image formation in the presence of hydrazine compounds (as described for instance in U.S. Pat. Nos. 4,168,977; 4,224,401; 4,269,929; 4,272,614 and 4,323,643 and in EP Patent Application Ser. No. 155,690), wherein the relative high pH levels in developing compositions reduce their effective life.

SUMMARY OF THE INVENTION

Aqueous alkaline photographic silver halide developer compositions, which can be left in continuous transport processing machines for several days without any significant degradation, comprising a hydroxybenzene developing agent, an auxiliary superadditive developing agent, an antifogging agent, an antioxidant and a buffering agent, are characterized by the fact that the compositions further comprise a stabilizing amount of an α-ketocarboxylic acid.

Said developer compositions are particularly suitable in a process for forming a high contrast silver image by developing silver halide photographic elements, including at least a negative acting surface latent image-type silver halide emulsion layer, in the presence of a hydrazine compound, preferably in the additional presence of an effective amount of a contrast promoting agent.

DETAILED DESCRIPTION OF THE INVENTION

The present invention relates to an aqueous alkaline photographic silver halide developer composition comprising a dihydroxybenzene developing agent, an auxiliary superadditive developing agent, an antifogging agent, an antioxidant compound and a buffering agent, characterized by further comprising a stabilizing amount of an α-ketocarboxylic acid compound.

Particularly, according to the present invention the α-ketocarboxylic acid compound corresponds to formula (I):

R—CO—COOH (I)

wherein R represents a hydrogen atom or an organic group. Organic groups useful in the above formula are well known in the photographic art and can be selected upon the basis of various common criteria. For example, they should be reasonable in size and nature, useful to the properties of the α-ketocarboxylic acid compounds such as to control their solubility in the photographic developer composition and to obtain the desired stabilizing effects with no significant deleterious effects on the photographic characteristics of the silver image, such as fog, sensitivity and contrast. In the compounds represented by the formula (I) above, R particularly represents a COOH group or a substituted or unsubstituted aliphatic group, a substituted or unsubstituted aromatic group or a substituted or unsubstituted heterocyclic group, each of these R groups preferably having a number of carbon atoms not higher than 12. The aliphatic groups include straight and branched chain alkyl groups, cycloalkyl groups, alkenyl groups and alkynyl groups. Said straight or branched chain aliphatic groups (comprising alkyl, alkenyl and alkynyl groups) preferably contain 1 to 8 carbon atoms (e.g., methyl, ethyl, propyl, allyl, butyl, amyl, hexyl, octyl), and more preferably contain 1 to 4 carbon atoms. The cycloalkyl groups preferably contain 3 to 10 carbon atoms; preferred examples thereof include cyclopropyl, cyclopentyl, cyclohexyl and adamantyl groups. The substituted or unsubstituted aromatic groups preferably contain 6 to 10 ring carbon atoms (e.g., phenyl, naphthyl). Useful substituents of said aliphatic and aromatic groups include halogen, aryl, cyano, carboxy, alkylcarbonyl, arylcarbonyl, alkoxy, alkoxycarbonyl, aryloxycarbonyl, alkylaryloxycarbonyl, sulfoxy, alkylsulfonyl, arylsulfonyl, and the like. Typical examples of α-ketocarboxylic acid compounds according to the present invention include HOC—COOH (glyoxylic acid), HOOC—CO—COOH (mesoxalic acid), $CH_3$—CO—COOH (pyruvic acid), HOOC—CO—$CH_2$—CO—COOH (oxalacetic acid), $C_2H_5$—CO—COOH (2-ketobutyric acid), HOOC—$CH_2$—$CH_2$—CO—COOH (2-ketoglutaric acid), $C_6H_5$—$CH_2$—CO—COOH (phenylpyruvic acid) and

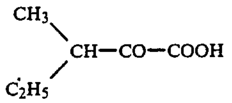

(α-keto-β-methylvaleric acid). α-Ketocarboxylic acid compounds may be advantageously obtained by oxidation under mild conditions of α-hydroxy acids or methyl ketones. These and other methods to obtain α-ketocarboxylic acid compounds are described, for example, by V. Migrdichian, Organic Synthesis, Reinhold Publ., 1956, page 267.

The dihydroxybenzene developing agents employed in the aqueous alkaline developing solutions of this invention are well-known and widely used in photographic processing. The preferred developing agent is hydroquinone. Other useful dihydroxybenzene developing agents include chlorohydroquinone, bromohydroquinone, isopropylhydroquinone, tolylhydroquinone, methylhydroquinone, 2,3-dichlorohydroquinone, 2,5-dimethylhydroquinone, 2,3-dibromohydroquinone, 1,4-dihydroxy-2-acetophenone-2,5-dimethylhydroquinone, 2,5-diethylhydroquinone, 2,5-di-p-phenethylhydroquinone, 2,5-dibenzoylaminohydroquinone, 2,5-diacetamidohydroquinone, and the like.

Such developing agents can be used alone or, preferably, in combination with an auxiliary developing agent or agents which show a superadditive developing effect, such as p-aminophenol and substituted p-aminophenols (e.g. N-methyl-p-aminophenol or metol and 2,4-diaminophenol) and 3-pyrazolidones (e.g. 1-phenyl-3-pyrazolidone or phenidone) and substituted pyrazolidones (e.g. 4-methyl-1-phenyl-3-pyrazolidone and 4,4'-dimethyl-1-phenyl-pyrazolidone).

The aqueous alkaline developing compositions of this invention contain an antioxidant compound in a quantity sufficient to give good stability characteristics. Useful antioxidant compounds include the sulfite preservatives, i.e. any sulfur compound capable of forming sulfite ions in aqueous solutions, such as alkali metal or ammonium sulfites, bisulfites, metabisulfites, sulfurous acid and carbonyl-bisulfite adducts. Typical examples of sulfite preservatives include sodium sulfite, potassium sulfite, lithium sulfite, ammonium sulfite, sodium bisulfite, potassium metabisulfite, bisulfite-formaldehyde addition compound sodium salt, and the like. Also ascorbic acid is a known preservative against aerial oxidation of the developer for use in the developing composition of the present invention.

The antifoggant agents, known in the art to eliminate fog on the developed photographic silver halide films useful in the developer compositions of this invention include organic antifoggant agents, such as derivatives of benzimidazole, benzotriazole, tetrazole, imidazole, indazole, thiazole, etc., used alone or in combination. The organic antifoggants are well known as discussed, for example, in Mees, The Theory of the Photographic Process, 3rd Edition, 1966, p. 344-346. Derivatives of benzimidazole and benzotriazole are preferred in the practice of this invention, as described in EP Patent Application Ser. No. 182,293. Said derivatives include lower alkyl groups (having 1 to 4 carbon atoms) or halogen (chlorine) substituted benzimidazole and benzotriazole antifoggant agents.

At least an inorganic alkali agent is used in the developer compositions of this invention to achieve the preferred pH range which normally is above 10. The inorganic alkali agent group includes KOH, NaOH, potassium and sodium carbonate, etc.

Other adjuvants well known in the art are comprised in the developer compositions of this invention. These include inorganic antifogging agents such as soluble halides (e.g. KBr and NaBr), buffering agents (e.g. borates, carbonates and phosphates) and sequestering agents such as aminopolycarboxylic acid compounds (e.g. nitrilotriacetic acid or NTA, ethylenediaminotetracetic acid or EDTA, diethylenetriaminopentacetic acid or DTPA, diaminopropanoltetracetic acid or DPTA and ethylenediamino-N,N,N',N'-tetrapropionic acid or EDTP), α-hydroxycarboxylic acid compounds (e.g. lactic acid), dicarboxylic acid compounds (e.g. oxalic acid and malonic acid) or polyphosphate compounds (e.g. sodium hexamataphosphate).

The aqueous alkaline developing compositions of this invention can vary widely with respect to the concentration of the various ingredients included therein. Typically, the dihydroxybenzene developing agent is used in an amount of from about 0.040 to about 0.70 moles per liter, preferably in an amount of from about 0.08 to about 0.40 moles per liter; the auxiliary developing agent is used in an amount of from about 0.0001 to about 0.15 moles per liter, preferably in an amount of from about 0.0005 to about 0,01 moles per liter; the inorganic antifogging agent is used in an amount of from about 0.001 to about 0.2 moles per liter, preferably in an amount of from about 0.01 to about 0.05 moles per liter; the antioxidant compound (such as the sulfite preservative) is used in an amount of from about 0.001 to about 1 moles per liter, preferably in an amount of from about 0.08 to about 0.7 moles per liter of solution; the organic antifogging compound is used in an amount of from about $1\times10^{-5}$ to about $5\times10^{-2}$ moles per liter, preferably in an amount of from about $5\times10^{-4}$ to about $1\times10^{-2}$ moles per liter; the buffering agent is used in an amount of from about 0.02 to about 1 moles per liter, preferably is used in an amount of from about 0.07 to about 0.5 moles per liter and the sequestering agent is used in an amount of from about $1\times10^{-4}$ to about 0.2 moles per liter, preferably in an amount of from about $5\times10^{-3}$ to about $3\times10^{-2}$ moles per liter.

According to the present invention, the black and white developer composition comprising the above reported ingredients has a better resistance to air oxidation if including an α-ketocarboxylic acid in a stabilizing quantity. The developer composition according to the present invention can be left in continuous transport automatic processors for several days, such as for instance for two days, without being replaced with fresh developer solutions or continuously replenished with a replenisher composition still maintaining substantially unchanged its development capability. The effective stabilizing quantity of the α-ketocarboxylic acid preferably ranges from about $5\times10^{-5}$ to about $3\times10^{-1}$ moles per liter, more preferably from about 0.01 to about 0.08 moles per liter.

Of course, the stabilizing effect of the compounds of the present invention depend upon their chemical nature, upon the quantity with which they are used and upon the chemical nature of the developer composition the stability of which has been improved by adding the compounds of the present invention. The man skilled in the art can choose the most suitable compounds to be used and the quantities thereof according to his operational needs and the stabilization demands.

The man skilled in the art can also evaluate the stabilization improvements, thus obtained, to be more or less significant according to particular circumstances he has found.

To the purposes of the present invention it is deemed to be significant to evaluate the stability of the developing bath as absorbance variation (measured at 500 nm) when a sample of 100 ml developer solution is stored under room conditions in a 1000 ml open flask in contact with air for significant times, for instance of one, two or three days (from a practical point of view two days and, still better, three days are a particularly significant time since they represent a week-end work stop).

Making reference to a three-day period of time, the stability of a developing bath can be said to be significantly improved according to the present invention when the absorbance, measured under the above specified conditions with a Lambda 5 spectrophotometer of Perkin Elmer, is brought to a value not higher than 1, preferably not higher than 0.8 by adding $\alpha$-ketocarboxylic acid.

Of course, both the pH of the solution and the storing temperature will affect the obtained results. The higher the values of such variables, the higher in general the measured absorbance values.

Alternatively and, preferably, additionally, a bath can be considered to be stable when its pH is stable. To the purposes of the present invention, a developing bath can be considered to be unstable when after three days under the above reported conditions its pH varies of an absolute value, which is the sum of all changes of at least 0.025, higher than 0.2 unit, while it can be considered to be stable when pH varies of an absolute value lower or equal to 0.2 units. The term "absolute value" obviously means that the total variation and the single variations it consists of are counted undependently from their sign: a first variation from 0 to $-0.2$ and a further variation from $-0.2$ to $+0.2$, for instance, herein mean a total variation in absolute value of 0.6.

The photographic developer compositions of the present invention, having improved resistance to air oxidation, are useful for forming black and white silver images by development of light-sensitive silver halide photographic elements, more specifically for forming high contrast silver images by development of lithographic films used in the field of graphic arts.

In particular, said developer compositions are useful for forming high contrast silver images by development of a photographic element, including a negative acting surface latent image-type silver halide emulsion layer, in the presence of a hydrazine compound, preferably in the additional presence of a contrast promoting agent.

Accordingly, in one particular aspect the present invention relates to a process for forming a high contrast negative photographic image by development of a silver halide photographic element, including at least a negative acting surface latent image-type silver halide emulsion layer, in the presence of a hydrazine compound and preferably in the additional presence of a contrast promoting agent, with the aqueous alkaline developer composition comprising a dihydroxybenzene developing agent, an auxiliary superadditive developing agent, an antifogging agent, an antioxidant compound, a buffering agent, and a stabilizing amount of an $\alpha$-ketocarboxylic acid compound, as described above.

The silver halide emulsions for use in the process of the present invention may be silver chloride, silver chloro-bromide, silver iodo-bromide, silver iodo-chloro-bromide or any mixture thereof. Generally, the iodide content of the silver halide emulsions is less than about 10% iodide moles, said content being based on the total silver halide. The silver halide emulsions are usually monodispersed or narrow grain size distribution emulsions, as described for example in U.S. Pat. Nos. 4,166,742; 4,168,977; 4,224,401; 4,237,214; 4,241,164; 4,272,614 and 4,311,871. The silver halide emulsions may comprise a mixture of emulsions having different grain combinations, for example a combination of an emulsion having a mean grain size below 0.4$\mu$ with an emulsion having a mean grain size above 0.7$\mu$, as described in Japanese Patent Application Ser. No. 57-58137 or a combination of two emulsions, both having a grain size below 0.4$\mu$, such as for example a first silver halide emulsion having a mean grain size of 0.1 to 0.4$\mu$ and a second silver halide emulsion with particles having a mean grain volume lower than one half the particles of the first emulsion.

The silver halide grains of the emulsions for use in the process of the present invention are capable of forming a surface latent image, as opposed to those emulsions forming an internal latent image. Surface latent image-forming silver halide grains are most employed in negative type silver halide emulsions, while internal latent image-forming silver halide grains, though capable of forming a negative image when developed in an internal developer, are usually employed with surface developers to form direct-positive images. The distinction between surface latent image and internal latent image-forming silver halide grains is well-known in the art. Generally, some additional ingredients or steps are required in the preparation of silver halide grains capable of preferentially forming an internal latent image instead of a surface latent image.

In the silver halide emulsions for use in the process of the present invention, the precipitation or the growth of the silver halide grains may be carried out in the presence of metal salts or complex salts thereof, such as rhodium and iridium salts or complex salts thereof. According to the present invention, the presence of rhodium or iridium has been found anyhow not to be necessary to obtain the high contrasts. Silver halide grains free of rhodium or iridium, as well as those formed or ripened in the presence of rhodium and iridium may be used.

The silver halide emulsions of the process of the present invention may be not chemically sensitized, but are preferably chemically sensitized. As chemical sensitization methods for silver halide emulsions, the known sulfur sensitization employing sulfur compounds, the reduction sensitization employing mild reducing agents and the noble metal sensitization can be used, either alone or in combination.

The silver halide emulsions can be spectrally sensitized with dyes from a variety of classes, including the polymethine dye class, such as cyanines, merocyanines, complex cyanines and merocyanines (i.e., tri-, tetra- and poly-nuclear cyanines and merocyanines), oxonols, hemioxonols, styryls, merostyryls and streptocyanines.

The binder or protective colloid for the silver halide layer and layers of the photographic element is preferably gelatin, but other hydrophilic colloids or synthetic water insoluble polymers in the form of latexes can be used for partially or completely replacing gelatin.

In addition, the photographic elements may also contain any photographic additive known in the art, such as for example stabilizers, antifoggants, hardeners, plasticizers, development accelerators, gelatin extenders, matting agents and the like.

To achieve the benefits of this invention, a hydrazine compound has to be present during development of the exposed element.

The hydrazine compound can be incorporated in the photographic element or in the developing solution or both in the developing solution and in the photographic element.

Hydrazine and any water soluble hydrazine derivative are effective to increase contrast when incorporated in the developing composition. Preferred hydrazine derivatives to be used in the developing solution of this invention include compounds of formula (V):

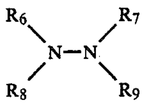

(V)

wherein $R_6$ is an organic radical and $R_7$, $R_8$ and $R_9$ each are hydrogen or an organic radical. Organic radicals represented by $R_6$, $R_7$, $R_8$ and $R_9$ include hydrocarbon groups, such as an alkyl group, an aryl group, an aralkyl group and an alicyclic group and such groups can be substituted with substituents such as alkoxy groups, carboxy groups, sulfonamido groups and halogen atoms.

Other examples of hydrazine derivatives, which can be incorporated in the developing solutions, are hydrazides, acyl hydrazines, semicarbazides, carbohydrazides and aminobiuret compounds.

Specifical examples of hydrazine derivatives, which can be incorporated in the developing solutions of the present invention are disclosed in U.S. Pat. No. 2,419,575.

Preferably, the hydrazine compound is incorporated in the photographic element, for example in a silver halide emulsion layer or in a hydrophilic colloidal layer, preferably a hydrophilic colloidal layer adjacent to the emulsion layer in which the effects of the hydrazine compound are desired. It can, of course, be present in the photographic element distributed between the emulsion and the hydrophilic colloidal layers, such as a subbing layers, interlayers and protective layers.

Hydrazine compounds suitable to be incorporated into the photographic element are disclosed in GB Patent Specification No. 598,108 and in U.S. Pat. No. 2,419,974; they include the water soluble alkyl, aryl and heterocyclic hydrazine compounds, as well as the hydrazide, semicarbazide and aminobiuret compounds.

Particularly preferred hydrazine compounds, for use according to this invention incorporated in the photographic element, are the formylhydrazine compounds corresponding to the formula:

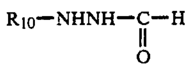

(VI)

wherein $R_{10}$ represents a substituted or unsubstituted aromatic group. Examples of aromatic groups represented by $R_{10}$ include a phenyl group and a naphthyl group. Such aromatic groups may be substituted with one or more substituents which are not electron attracting, such as straight or branched-chain alkyl groups (e.g. methyl, ethyl, propyl, isopropyl, n-butyl, isobutyl, n-ottyl, n-hexyl, tert.-octyl, n-decyl, n-dodecyl, etc.), aralkyl groups (e.g. benzyl, phenethyl, etc.), alkoxy groups (e.g. methoxy, ethoxy, 2-methyl-propyloxy, etc.), amino groups which are mono- or disubstituted with alkyl groups, acylaminoaliphatic groups (e.g. acetylamino, benzoylamino, etc.), etc., as disclosed in U.S. Pat. No. 4,168,977 and in CA patent Specification No. 1,146,001. Such aromatic groups may also be substituted with a ureido group of formula:

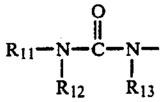

wherein $R_{11}$ and $R_{12}$ (which may be the same or different) each represents hydrogen, an aliphatic group (such as a straight or branched-chain alkyl group, a cycloalkyl group, a substituted cycloalkyl group, an alkenyl group and an alkynyl group), an aromatic group (such as a phenyl group and a naphthyl group) or a heterocyclic group; $R_8$ represents hydrogen or an aliphatic group (such as those listed above) as described in U.S. Pat. No. 4,323,643.

Other hydrazine compounds, for use incorporated in the photographic element, are those represented by the formula:

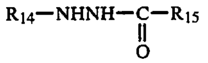

(VII)

wherein $R_{14}$ represents the same aromatic group of the the formula above and $R_{15}$ represents an alkyl group having 1 to 3 carbon atoms, which may be a straight or branched-chain alkyl (e.g. methyl, ethyl, n-propyl and isopropyl) or a phenyl group. The phenyl group may be substituted with one or more substituents which preferably are electron attracting groups, such as halogen atoms (chlorine, bromine, etc.), a cyano group, a trifluoromethyl group, a carboxy group or a sulfo group, etc. Specific examples of hydrazine compounds represented by the formula above are disclosed in U.S. Pat. No. 4,224,401.

Still other examples of hydrazine compounds, for use according to this invention incorporated in the photographic element, are those corresponding to the formula (VIII):

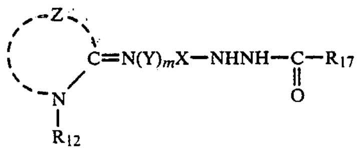

(VIII)

wherein $R_{16}$ represents hydrogen, an aliphatic group which may be substituted; Y represents a divalent linking group; m represents 0 or 1; X represents a divalent aromatic group (such as for example a phenylene group, a naphthylene group and the analogous substituted groups thereof); $R_{17}$ represents a hydrogen atom, an aliphatic group which may be substituted and Z represents a non metallic atom groups necessary to form a 5- or a 6-membered heterocyclic ring. Specific examples of hydrazine compounds represented by the formula above are disclosed in U.S. Pat. No. 4,272,614.

In one particular preferred form, the hydrazine compound to be incorporated in the photographic element is substituted with ballasting groups, such as the ballasting groups of incorporated color couplers and other non-diffusing photographic emulsion addenda. Said ballasting groups contain at least 8 carbon atoms and can be selected from the relatively non reactive aliphatic and aromatic groups, such as alkyl, alkoxy, alkylphenyl, phenoxy, alkylphenoxy groups and the like.

Such hydrazine compounds can be incorporated in the photographic element using various methods well-known in the photographic art, the most common being the method of dissolving the hydrazine derivatives in a high boiling crystalloidal solvent and dispersing the mixture in the emulsion, as described for example in U.S. Pat. No. 2,322,027.

Hydrazine compounds incorporated in the developing solutions in the practice of this invention are effective at very low levels of concentration. For example, hydrazine compounds give useful results in the developing solution in a quantity of about 0.001 moles per liter to about 0.1 moles per liter, more preferably in a quantity from about 0.002 to about 0.01 moles per liter. Hydrazine compounds incorporated in the photographic element are typically employed in a concentration ranging from about $5\times10^{-4}$ to about $5\times10^{-1}$ moles per mole of silver, more preferably in a quantity from about $8\times10^{-4}$ to about $5\times10^{-2}$ moles per mole of silver.

Preferably, according to the process of the present invention, a contrast promoting agent is additionally present during development in the presence of the hydrazine compound. The use of a contrast promoting agent allows a high contrast to be obtained by developing the photographic element in the presence of the hydrazine compound, at a pH lower than the pH necessary to obtain the high contrast when the hydrazine compound alone is used. As a consequence of a lower pH level, the effective life of the developer composition is further enhanced.

The contrast promoting agent has to be present during development of the exposed photographic element. The contrast promoting agent may be incorporated in the photographic element or in the developer composition or both in the photographic element and in the developer composition.

The contrast promoting agents combined with the hydrazine compounds produce a very high contrast, which means a contrast of at least 10. This contrast is the slope of the straight line portion of the characteristic curve (referred to as "average contrast") and is measured between two points located at densities of 0.10 and 2.50 above Dmin.

A preferred class of contrast promoting agents are the alkanolamine compounds which comprise amine compounds wherein the nitrogen atom is directly attached to a hydroxyalkyl group. Particularly preferred alkanolamine compounds, for use as contrast promoting agents, are the compounds of formula (IX):

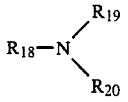

(IX)

wherein $R_{18}$ represents an hydroxyalkyl group of 2 to 10 carbon atoms and $R_{19}$ and $R_{20}$ each represent a hydrogen atom, an alkyl group of 1 to 10 carbon atoms, a hydroxyalkyl group of 2 to 10 carbon atoms, a benzyl group, or a

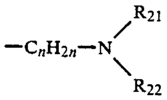

group wherein n is an integer of 1 to 10 and $R_{21}$ and $R_{22}$ each represent a hydrogen atom, an alkyl group of 1 to 10 carbon atoms, or a hydroxyalkyl group of 2 to 10 carbon atoms.

Typical specific examples of the numerous alkanolamine compounds that can be used those described in the U.S. Pat. No. 4,269,929.

Preferably, the alkanolamine compounds are incorporated in the aqueous alkaline developer composition in a contrast promoting amount. The alkanolamine compounds differ markedly in their degree of effectiveness as contrast promoting agents. The less effective alkanolamine compounds may be used at a relatively high concentration to obtain high contrast at lower pH, such as a pH lower than 12. Typically, the alkanolamine compounds are used in an amount of about 0.009 to about 0.85 moles per liter, preferably in an amount of about 0.09 to about 0.35 moles per liter of developing solution.

A still more preferred class of contrast promoting agents are arylalkyl alcohols, such as those described in European patent application Ser. No. 155,690 and, preferably, the compounds containing a hydroxymethylidine group. Particularly preferred hydroxymethylidine group containing compounds, for use as contrast promoting agents, are the compounds of formula (II):

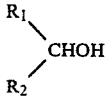

(II)

wherein $R_1$ and $R_2$ each indipendently represent a hydrogen atom, an aliphatic group, an aromatic group, a heterocyclic group, or $R_1$ and $R_2$ together complete a non-aromatic cyclic group.

The aliphatic groups represented by each of $R_1$ and $R_2$ include a straight or branched chain alkyl group, a cycloalkyl group, an alkenyl group, an alkynyl group. Examples of straight or branched chain alkyl groups are alkyl groups having 1 to 10, and preferably 1 to 5 carbon atoms, such as a methyl group, an ethyl group, a propyl group, a butyl group. The cycloalkyl group has generally 3 to 10 carbon atoms. Preferred examples thereof are a cyclopropyl group, a cyclopentyl group, a cyclohexyl group, an adamantyl group.

Examples of aromatic groups shown by each of $R_1$ and $R_2$ include a phenyl group and a naphthyl group.

The heterocyclic ring group shown by each of $R_1$ and $R_2$ is a 5-membered or 6-membered single or condensed ring, having at least one oxygen, nitrogen, sulfur or selenium atom with or without substituents. Preferred examples of heterocyclic groups include a pyrroline ring, a pyridine ring, a quinoline ring, an indole ring, an oxazole ring, a benzoxazole ring, a naphthoxazole ring, an imidazole ring, a benzimidazole ring, a thiazoline ring, a thiazole ring, a benzothiazole ring, a naphthothiazole ring, a selenazole ring, a benzoselenazole ring, a naphthoselenazole ring, etc.

Of course, as known in the art, such described $R_1$ and $R_2$ substituents may be substituted with any substituents known in the art not to negatively affect the development process. Examples of such substituents could be alkyl, alkoxy and hydroxy substituents.

when the hydroxymethylidine group containing compounds are incorporated in the aqueous alkaline developer composition, a parameter to take into proper account is their water solubility. In order not to have them water-insoluble, it is preferred to keep the total number of carbon atoms in $R_1$ and $R_2$ to a value of less than 20 carbon atoms, preferably less than 15 carbon atoms.

Specific examples of hydroxymethylidine group containing compounds that can be used in the process of the present invention include the folowing compounds:

(1) methyl alcohol
(2) ethyl alcohol
(3) 1-propanol
(4) 2-propanol
(5) 1-butanol
(6) 2-methyl-1-propanol
(7) 3-methyl-1-butanol
(8) 2-propen-1-ol
(9) benzyl alcohol
(10) salicyl alcohol
(11) p-methoxy-benzyl alcohol
(12) β-phenethyl alcohol
(13) 1-phenyl-ethan-1-ol (phenyl-methyl carbinol)
(14) diphenylmethanol (benzydrol)
(15) 3-phenyl-1-propen-1-ol (cinnamyl alcohol)
(16) 4-diphenylmethanol
(17) 1-phenyl-1,2-ethanediol (styrene glycol)
(18) tetrahydrofurfuryl alcohol
(19) 1,2-ethanediol
(20) 1,2-propanediol
(21) 1,3-propanediol
(22) 1,2-butanediol
(23) 1,3-butanediol
(24) 1,4-butanediol
(25) 1,5-pentanediol
(26) 1,6-hexanediol
(27) pinacol
(28) 2-butene-1,4-diol
(29) 1,2-cyclohexanediol
(30) 1,4-cyclohexanediol
(31) 1,2,4-butanetriol
(32) phenylethylcarbinol
(33) phenylcyclopropylcarbinol
(34) cycloheptanol
(35) 1,2,3,4-tetrahydro-1-naphthol (α-tetralol).

Typically, the hydroxymethylidine group containing compounds when incorporated in the developer composition, are used in an amount of about 0.001 to about 3.00 moles per liter, preferably in an amount of about 0.01 to about 1.50 moles per liter. When used in reactive association with the negative acting surface latent image-type silver halide grains incorporated in the silver halide element, the hydroxymethylidine group containing compounds are preferably diarylcarbinol compounds.

More preferably said diarylcarbinol compounds corresponds to the formula (III) or (IV):

$$R_3R_4R_5COH \quad \text{(III)}$$

$$R_3R_4R_5C(CH_2)_mOH \quad \text{(IV)}$$

wherein $R_3$ and $R_4$ represent a substituted or unsubstituted aromatic group, $R_5$ represents a hydrogen atom, a substituted or unsubstituted alkyl group or a substituted or unsubstituted aromatic group and m represents a positive integer from 0 to 4.

The diarylcarbinol compounds can be present during development of the exposed element and the element can contain the diarylcarbinol compound prior to the contact with the whole developer composition. By "contact with the whole developer composition" is meant that the exposed element is placed into conctact with all of the required developer ingredients.

Accordingly, the diarylcarbinol compounds can be incorporated into the photographic element. For example they may be incorporated in the silver halide emulsion layer of the element or in a hydrophilic colloid layer adjacent to the silver halide emulsion layer in which the effects of the diarylcarbinol compounds are desired. They can, for instance, be present in the photographic element distributed between the emulsion layer(s) and the hydrophilic colloid layers, such as for instance a subbing layer, interlayers and protective layers.

The aromatic groups represented by $R_3$, $R_4$ and $R_5$ of formulas (III) and (IV) above include a naphthyl group and, preferably, a phenyl group. The alkyl groups represented by $R_5$ of formulas (III) and (IV) above include branched or straight chain alkyl groups, preferably low alkyl groups (having 1 to 5 carbon atoms). Such groups may contain substituents, such substituents being chosen in nature and size as not to negatively affect their behaviour according to the present invention. For what concerns their nature, such substituents include for example an alkyl group, an alkoxy group, a cyano group, a dialkylamino group, an alkoxycarbonyl group, a carboxy group, a nitro group, an alkylthio group, a hydroxy group, a sulphoxy group, a carbamoyl group, a sulfamoyl group, a halogen group, etc. With regard to their size, such substituents are preferred to have 1 to 10 carbon atoms, more preferably 1 to 5 carbon atoms.

Parameters to take into proper consideration are solubility and boiling point of the diarylcarbinol compounds for use in the process of the present invention. In fact said compounds are to be substantially water soluble or soluble in water miscible solvents (by "substantially water soluble" it is meant soluble in water in a quantity of at least 1% by weight and by "soluble" in water miscible solvents it is meant that they are to be soluble in water miscible solvents in a quantity of at least 5% by weight) in order to introduce them into the aqueous coating compositions used to form the layers of the photographic elements according to the present invention. Said diarylcarbinol compounds are required to have a sufficiently high boiling point not to evaporate during drying of the layer forming coating composition. Said boiling points are preferably higher than 150° C., more preferably higher than 200° C.

Specific examples of diarylcarbinol compounds include the following compounds:

(1) diphenylmethanol (benzydrol)
(2) 4,4'-dimethoxydiphenylmethanol
(3) 4,4'-dimethyldiphenylmethanol
(4) 2,2'-dibromodiphenylmethanol
(5) 4,4'-dibromodiphenylmethanol
(6) 2,2'-dinitrodiphenylmethanol
(7) 4,4'-dinitrodiphenylmethanol
(8) 2,3'-dimethoxydiphenylmethanol
(9) 2,4'-dihydroxydiphenylmethanol
(10) 4-ethyldiphenylmethanol
(11) 4-methyldiphenylmethanol
(12) 2,2',4,4'-tetramethyldiphenylmethanol.

The diarylcarbinol compounds are used incorporated into the photographic silver halide element in amount form about $10^{-4}$ to about $10^{-1}$ moles per mole of silver, more preferably in an amount from about $10^{-3}$ to about $5\times10^{-2}$ moles per mole of silver.

The following examples, which further illustrate the invention, report some experimental data in order to show the stability to aerial oxidation of the developer compositions of the present invention. In particular, the absorbance at 500 nm of 100 ml of developer solution stored in a 1,000 ml conical flask in contact with air and the variation of the pH between fresh and stored developer solution (ΔpH) were measured. It is in fact well known that aerial oxidation of alkaline developers containing hydroquinone results in the liberation of alkali (and therefore a pH increase) and in the darkening of the solution.

EXAMPLE 1

Three silver halide photographic developer solutions (I to III) were prepared according to the following table 1:

TABLE 1

| | | I | II | III |
|---|---|---|---|---|
| Water | ml | 600 | 600 | 600 |
| KOH 35% | g | 210 | 250 | 257 |
| 1-phenyl-4,4-dimethyl-3-pyrazolidone | g | 0.4 | 0.4 | 0.4 |
| sec-phenethyl alcohol | g | 1.5 | 2.5 | 2.5 |
| 5-methylbenzotriazole | g | 0.1 | 0.1 | 0.1 |
| DTPA.5Na 40% | g | 5 | — | — |
| EDTA | g | — | 3 | 5 |
| Ketomalonic acid.$H_2O$ | g | — | 2 | — |
| Pyruvic acid | g | — | — | 5 |
| KBr | g | 3 | 3 | 3 |
| KCl | g | 2 | 2 | 2 |
| $H_3PO_4$ 86% | g | 38 | 45 | 45 |
| $K_2SO_3$ 44% | g | 200 | 200 | 200 |
| Hydroquinone | g | 30 | 30 | 30 |
| Water to make 1 liter | | | | |
| pH at 20° C. | | 11.5 | 11.5 | 11.5 |

The values of the absorbance at 500 nm for the developer solutions stored for different days are reported hereinbelow in Table 2.

TABLE 2

| Developer solutions | Absorbance values 1 day | 2 days | 3 days |
|---|---|---|---|
| I | 0.20 | 0.50 | 1.60 |
| II | 0.10 | 0.40 | 0.70 |
| III | 0.10 | 0.30 | 0.60 |

EXAMPLE 2

Two silver halide photographic developer solutions (IV and V) were prepared according to the following table 3:

TABLE 3

| | | IV | V |
|---|---|---|---|
| Water | ml | 800 | 800 |
| KOH 35% | g | 72 | 72 |
| $K_2S_2O_5$ | g | 35 | 35 |
| $K_2CO_3$ | g | 9.8 | 9.8 |
| DPTA.5Na 40% | g | 5 | — |
| EDTA | g | — | 3 |
| Diethanolamine | g | 15.6 | 15.6 |
| Lactic acid 80% | g | 8 | — |
| Pyruvic acid | g | — | 5 |
| KBr | g | 3.3 | 3.3 |
| Hydroquinone | g | 16 | 16 |
| 1-Phenyl-3-pyrazolidone | g | 0.24 | 0.24 |
| 1-Phenyl-5-mercapto-tetrazole | g | 0.028 | 0.028 |
| Benzotriazole | g | 0.65 | 0.65 |
| Water to make 1 liter | | | |
| pH at 20° C. | | 10.49 | 10.49 |

The ΔpH and the absorbance values at 500 nm of the stored developer solutions are reported hereinbelow in table 4.

TABLE 4

| Developer solutions | Δ pH 1 day | 2 days | Absorbance values 1 day | 2 days | 3 days |
|---|---|---|---|---|---|
| IV | +0.6 | +0.7 | 0.2 | 2.0 | 3.0 |
| V | +0.05 | +0.1 | 0.1 | 0.2 | 0.6 |

EXAMPLE 3

Six silver halide photographic developer solutions (VI to XI) were prepared according to the following table 5:

TABLE 5

| | VI | VII | VIII | IX | X | XI |
|---|---|---|---|---|---|---|
| Water ml | 60 | 60 | 60 | 60 | 60 | 60 |
| KOH 35% g | 8 | 8 | 8 | 8 | 8 | 8 |
| 1-phenyl-4,4-dimethyl-3-pirazolidone mg | 40 | 40 | 40 | 40 | 40 | 40 |
| Sec.-phenethyl alcohol mg | 250 | 250 | 250 | 250 | 250 | 250 |
| 5-methylbenzotriazole mg | 10 | 10 | 10 | 10 | 10 | 10 |
| KBr mg | 300 | 300 | 300 | 300 | 300 | 300 |
| KCl mg | 200 | 200 | 200 | 200 | 200 | 200 |
| $K_2SO_3$ 44% g | 20 | 20 | 20 | 20 | 20 | 20 |
| EDTA g | — | 0,6 | — | — | 0,6 | — |
| DTPA.5Na g | — | — | 0,5 | — | — | 0,5 |
| Pyruvic acid g | — | — | — | 0,2 | 0,2 | 0,2 |
| Hydroquinone g | 3 | 3 | 3 | 3 | 3 | 3 |
| Water to make 100 ml | | | | | | |
| pH at 20° C. | 11.50 | 11.50 | 11.50 | 11.50 | 11.50 | 11.50 |

Each of the above developer solutions was stored in a 1,000 ml conical flask in contact with air and the time necessary to have an absorbance at 500 nm higher than about 3 was measured. The time in hours is reported hereinbelow in table 6.

TABLE 6

| Developer solution | Oxidation time (hours) |
|---|---|
| VI | 65 |
| VII | 40 |
| VIII | 35 |
| IX | 63 |
| X | 110 |

TABLE 6-continued

| Developer solution | Oxidation time (hours) |
|---|---|
| XI | 113 |

EXAMPLE 4

Two silver halide photographic developer solutions (XII and XIII) were prepared according to the following table 7:

TABLE 7

| | | XII | XIII |
|---|---|---|---|
| Water | ml | 675 | 675 |
| KOH 35% | g | 285 | 292 |
| $K_2S_2O_5$ | g | 65 | 65 |
| 1-Phenyl-4,4-dimethyl-3-pyrazolidone | g | 0.4 | 0.4 |
| 5-Methylbenzotriazole | g | 0.1 | 0.1 |
| DTPA.5Na 40% | g | 5 | 5 |
| Pyruvic acid | g | — | 3 |
| KBr | g | 3 | 3 |
| KCl | g | 2 | 2 |
| $H_3PO_4$ 86% | g | 45 | 45 |
| Hydroquinone | g | 30 | 30 |
| Water to make 1 liter | | 11.00 | 11.00 |
| pH at 20° C. | | | |

The ΔpH and the absorbance values at 500 nm of the developer solutions after 3 days storage are reported in the table 8:

TABLE 8

| Developer solutions | Δ pH | Absorbance values |
|---|---|---|
| XII | +0.38 | 1.128 |
| XIII | +0.10 | 0.121 |

EXAMPLE 5

Two photographic developer solutions (XIV and XI) were prepared according to the following table 9:

TABLE 9

| | | XIV | XV |
|---|---|---|---|
| Water | ml | 675 | 675 |
| KOH 35% | g | 280 | 280 |
| $K_2S_2O_5$ | g | 65 | 65 |
| N—methyl-p-aminophenol sulfate | g | 2.5 | 2.5 |
| 5-methylbenzotriazole | g | 0.1 | 0.1 |
| DTPA.5 Na 40% | g | 5 | 5 |
| Pyruvic acid | g | — | 3 |
| KBr | g | 3 | 3 |
| KCl | g | 2 | 2 |
| $H_3PO_4$ 86% | g | 45 | 45 |
| Hydroquinone | g | 30 | 30 |
| Water to make 1 liter | | 11.00 | 11.00 |
| pH at 20° C. | | | |

The ΔpH and absorbance values at 500 nm of the deverloper solutions after 3 days storage are reported in the following Table 10:

TABLE 10

| Developer solutions | Δ pH | Absorbance values |
|---|---|---|
| XIV | +0.25 | >3 |
| XV | 0.00 | 0.36 |

I claim:

1. An aqueous alkaline photographic silver halide developer composition comprising a dihydroxybenzene developing agent, an auxiliary superadditive developing agent, an antifogging agent, an antioxidant compound and a buffering agent, characterized by containing a stabilizing amount of an α-ketocarboxylic acid compound.

2. The photographic silver halide developer composition of claim 1 wherein the α-ketocarboxylic acid compound corresponds to the following formula:

R—CO—COOH (I)

wherein R represents a hydrogen atom or an organic group.

3. The photographic silver halide developer composition of claim 1 wherein said α-ketocarboxylic acid compound is HOOC—CO—COOH.

4. The photographic silver halide developer composition of claim 1 wherein said α-ketocarboxylic acid compound is $H_3C$—CO—COOH.

5. The photographic silver halide developer composition of claim 1, wherein said auxiliary developing agent is selected in the class consisting of 3-pyrazolidone and p-aminophenol compound.

6. The photographic silver halide developer composition of claim 1, wherein the dihydroxybenzene developing agent is hydroquinone.

7. The photographic silver halide developer composition of claim 1, wherein the antifogging agents are selected within the group of the alkali metal halides.

8. The photographic silver halide developer composition of claim 1, wherein the antioxidant compounds are selected within the group of alkali metal sulphites and ascorbic acid.

9. The photographic silver halide developer composition of claim 1, wherein the antifogging agents are selected within the group consisting of benzotriazole and benzimidazole compounds.

10. The photographic silver halide developer composition of claim 1, wherein the buffering agents are selected within the group of alkali metal carbonates, borates and phosphates.

11. The photographic silver halide developer composition of claim 1, comprising a sequestering agent selected within the group consisting of aminopolycarboxylic acid compounds, α-hydroxycarboxylic acid compounds, dicarboxylic acid compounds and polyphosphate compounds.

12. The photographic silver halide developer composition of claim 1, comprising an alkanolamine compound.

13. The photographic silver halide developer composition of claim 1, comprising a hydroxymethylidine group containing compound of the following formula:

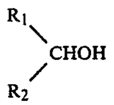
(II)

wherein $R_1$ and $R_2$ each independently represents a hydrogen atom, an aliphatic group, an aromatic group, a heterocyclic group, or $R_1$ and $R_2$ together complete a non-aromatic cyclic group.

14. A photographic silver halide developer composition comprising:

(a) a dihydroxybenzene developing agent in an amount of 0.04 to 0.7 moles per liter;

(b) an auxiliary developing agent in an amount of 0.0001 to 0.15 moles per liter;

(c) an inorganic antifogging agent in an amount of 0.001 to 0.2 moles per liter;

(d) an antioxidant compound in an amount of 0.001 to 1 moles per liter;

(e) a buffering compound in an amount of 0.02 to 1 moles per liter;

(f) a sequestering agent in an amount of $1\times10^{-4}$ to 0.2 moles per liter;

(g) an organic antifogging agent in an amount of $1\times10^{-5}$ to $5\times10^{-2}$ moles per liter;

(h) an $\alpha$-ketocarboxylic acid compound in an amount of $5\times10^{-5}$ to $3\times10^{-1}$ moles per liter;

(i) an inorganic alkali agent to have a pH in the range 9 to 13, and (l) water to make up one liter.

15. A photographic silver halide developer composition comprising:

(a) a dihydroxybenzene developing agent in an amount of 0.04 to 0.7 moles per liter;

(b) an auxiliary developing agent in an amount of 0.0001 to 0.15 moles per liter;

(c) an inorganic antifogging agent in an amount of 0.001 to 0.2 moles per liter;

(d) an antioxidant compound in an amount of 0.001 to 1 moles per liter;

(e) an alkanolamine compound in an amount of 0.009 to 0.85 moles per liter;

(f) a buffering compound in an amount of 0.02 to 1 moles per liter;

(g) a sequestering agent in an amount of $1\times10^{-4}$ to 0.2 moles per liter;

(b) an organic antifogging agent in an amount of $1\times10^{-5}$ to $5\times10^{-2}$ moles per liter;

(i) an $\alpha$-ketocarboxylic acid compound in an amount of $5\times10^{-5}$ to $3\times10^{-1}$ moles per liter;

(l) ) an inorganic alkali agent to have a pH in the range 10 to 12, and (m) water sufficient to make up one liter.

16. A photographic silver halide developer composition comprising:

(a) a dihydroxybenzene developing agent in an amount of 0.04 to 0.7 moles per liter;

(b) an auxiliary developing agent in an amount of 0.0001 to 0.15 moles per liter;

(c) an inorganic antifogging agent in an amount of 0.001 to 0.2 moles per liter;

(d) an antioxidant compound in an amount of 0.001 to 1 moles per liter;

(e) a hydroxymethylidine group containing compound of the following formula:

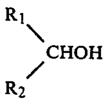

(II)

wherein $R_1$ and $R_2$ each indipendently represent a hydrogen atom, an aliphatic group, an aromatic group, a heterocyclic group or $R_1$ and $R_2$ together complete a non-aromatic cyclic group, in an amount of 0.001 to 3 moles per liter;

(f) a buffering compound in an amount of 0.02 to 1 moles per liter;

(g) a sequestering agent in an amount of $1\times10^{-4}$ to 0.2 moles per liter;

(h) an organic antifogging agent in an amount of $1\times10^{-5}$ to $5\times10^{-2}$ moles per liter;

(i) an $\alpha$-ketocarboxylic acid compound in an amount of $5\times10^{-5}$ to $3\times10^{-1}$ moles per liter;

(l) an inorganic alkali agent in an amount to have a pH in the range 10 to 12, and (m) water sufficient to make up one liter.

17. A process for forming a black and white photographic silver image by development of a light-sensitive silver halide photographic element in an aqueous alkaline developer composition as claimed in claim 1.

18. A process according to claim 17 for forming a black and white high-contrast negative photographic silver image by development of a silver halide photographic element, including at least a negative acting surface latent image-type silver halide emulsion layer, in the presence of a hydrazine compound.

19. The process of claim 18 wherein the silver halide element is developed in the presence of a contrast promoting amount of a compound selected from the group consisting of an alkanolamine and a hydroxymethylidine group containing compounds.

20. The process of claim 18 wherein the hydroxymethylidine group containing compound is included in the silver halide developer composition.

21. The process of claim 18 wherein the hydroxymethylidine group containing compound corresponds to the following formula:

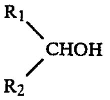

wherein $R_1$ and $R_2$ each independently represent a hydrogen atom, an aliphatic group, an aromatic group, a heterocyclic group, or $R_1$ and $R_2$ together complete a non-aromatic ciclic group.

22. The process of claim 18 wherein the hydroxymethylidine group containing compound is included in the silver halide photographic element.

23. The process of claim 22 wherein the hydroxymethylidine group containing compound is a diarylcarbinol compound according to one of the following formulas:

$$R_3R_4R_5COH \quad \text{(III)}$$

$$R_3R_4R_5C(CH_2)_mOH \quad \text{(IV)}$$

wherein $R_3$ and $R_4$ each represent an aryl group, $R_5$ represents a hydrogen atom, an alkyl group or an aryl group and m represents a positive integer from 0 to 4.

24. The process of claim 18 wherein the hydrazine compound is included in the silver halide photographic element.

25. The process of claim 24 wherein the hydrazine compound corresponds to the following formula:

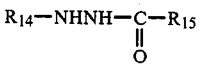

(VII)

wherein $R_{14}$ represents an aryl group and $R_{15}$ represents a hydrogen atom, an alkyl group or an aryl group.

* * * * *